United States Patent
Yu et al.

(10) Patent No.: US 11,375,509 B2
(45) Date of Patent: Jun. 28, 2022

(54) SUPPORT FOR RECEIVE-LIMITED USER EQUIPMENT IN WIRELESS ENVIRONMENTS

(71) Applicant: NOKIA TECHNOLOGIES OY, Espoo (FI)

(72) Inventors: Ling Yu, Kauniainen (FI); Jedrzej Stanczak, Poznan (PL); Dawid Koziol, Glogow (PL); Torsten Wildschek, Gloucestershire (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/733,511

(22) PCT Filed: Feb. 16, 2018

(86) PCT No.: PCT/EP2018/053875
§ 371 (c)(1),
(2) Date: Aug. 14, 2020

(87) PCT Pub. No.: WO2019/158208
PCT Pub. Date: Aug. 22, 2019

(65) Prior Publication Data
US 2020/0383100 A1 Dec. 3, 2020

(51) Int. Cl.
*H04W 72/04* (2009.01)
*H04W 4/40* (2018.01)
(Continued)

(52) U.S. Cl.
CPC ........... *H04W 72/048* (2013.01); *H04W 4/40* (2018.02); *H04W 68/02* (2013.01); *H04W 72/02* (2013.01);
(Continued)

(58) Field of Classification Search
CPC ....... H04W 68/02; H04W 4/27; H04W 48/08; H04W 48/16
(Continued)

(56) References Cited

U.S. PATENT DOCUMENTS 8,743,809 B2 * 6/2014 Vashi .................... H04W 72/02
370/344
9,699,690 B2 * 7/2017 Palm ................... H04W 72/048
(Continued)

FOREIGN PATENT DOCUMENTS

EP         3282753 A1    2/2018
WO    2014163565 A1   10/2014
(Continued)

OTHER PUBLICATIONS

B. Barua, Z. Khan, Z. Han, M. Latva-aho and M. Katz, "On the selection of best devices for cooperative wireless content delivery," 2014 IEEE Global Communications Conference, 2014, pp. 4845-4851, doi: 10.1109/GLOCOM.2014.7037573. Dec. 2014 (Year: 2014).*

(Continued)

*Primary Examiner* — William D Cumming
(74) *Attorney, Agent, or Firm* — Brake Hughes Bellermann LLP

(57) ABSTRACT

A user device may receive from a base station, information indicating that support for a receive limited user device is enabled based on a presence of a threshold number of receive limited user devices within a range of a cell of the base station. A receive limited user device is a user device that is unable to receive a transmission that was transmitted based on one or more communication capabilities of a full set of communication capabilities. The user device may select, in response to receiving the information, one or more communication capabilities to support a receive limited user (Continued)

device. The user device may transmit information using the selected one or more communication capabilities.

18 Claims, 7 Drawing Sheets

(51) Int. Cl.
  *H04W 68/02* (2009.01)
  *H04W 72/02* (2009.01)
  *G16Y 10/75* (2020.01)
(52) U.S. Cl.
  CPC ......... *H04W 72/0446* (2013.01); *G16Y 10/75* (2020.01)
(58) Field of Classification Search
  USPC ...... 455/458, 412.2, 511; 370/329, 331, 344
  See application file for complete search history.

(56) References Cited

U.S. PATENT DOCUMENTS

| | | | |
|---|---|---|---|
| 9,888,453 B2 * | 2/2018 | Arkko | H04W 68/005 |
| 10,117,221 B2 * | 10/2018 | Yu | H04W 68/02 |
| 10,264,607 B2 * | 4/2019 | Lee | H04W 72/04 |
| 10,334,538 B2 * | 6/2019 | Kahtava | H04W 16/08 |
| 10,383,114 B2 * | 8/2019 | Jiang | H04W 74/0808 |
| 10,484,911 B1 * | 11/2019 | Bogineni | H04W 12/06 |
| 10,506,513 B2 * | 12/2019 | Park | H04W 76/28 |
| 10,548,029 B2 * | 1/2020 | Panchal | H04W 76/10 |
| 10,567,999 B2 * | 2/2020 | Nguyen | H04L 67/1044 |
| 10,721,717 B2 * | 7/2020 | Gholmieh | H04W 72/04 |
| 2004/0142706 A1 * | 7/2004 | Kim | H04W 68/02 |
| | | | 455/511 |
| 2013/0021176 A1 * | 1/2013 | Tu | H04W 4/40 |
| | | | 455/412.2 |
| 2013/0089039 A1 * | 4/2013 | Vashi | H04W 72/02 |
| | | | 370/329 |
| 2013/0322370 A1 | 12/2013 | Fong et al. | |
| 2014/0153530 A1 * | 6/2014 | Iwai | H04W 68/00 |
| | | | 370/329 |
| 2015/0055572 A1 * | 2/2015 | Ishikura | H04W 72/048 |
| | | | 370/329 |
| 2015/0223199 A1 * | 8/2015 | Arkko | H04W 52/0225 |
| | | | 455/458 |
| 2015/0296481 A1 * | 10/2015 | Yu | H04W 72/0446 |
| | | | 370/336 |
| 2016/0044566 A1 * | 2/2016 | Nammi | H04B 1/1027 |
| | | | 370/331 |
| 2016/0262053 A1 * | 9/2016 | Palm | H04W 48/16 |
| 2017/0280445 A1 * | 9/2017 | Jiang | H04W 74/0808 |
| 2018/0049123 A1 * | 2/2018 | Park | H04W 68/02 |
| 2018/0076872 A1 * | 3/2018 | Li | H04L 5/0094 |
| 2018/0220383 A1 * | 8/2018 | Kahtava | H04W 52/383 |
| 2018/0255525 A1 * | 9/2018 | Uchiyama | H04W 56/0015 |
| 2018/0317260 A1 * | 11/2018 | Lee | H04W 72/0446 |
| 2019/0007992 A1 * | 1/2019 | Kim | H04W 76/27 |
| 2019/0082353 A1 * | 3/2019 | Nguyen | H04W 28/08 |
| 2019/0166586 A1 * | 5/2019 | Gholmieh | H04W 72/04 |
| 2019/0335343 A1 * | 10/2019 | Panchal | H04W 24/02 |
| 2019/0364460 A1 * | 11/2019 | Bogineni | H04W 76/10 |
| 2019/0387496 A1 * | 12/2019 | Liu | H04L 12/189 |
| 2020/0045586 A1 * | 2/2020 | Bogineni | H04W 28/16 |
| 2020/0136703 A1 * | 4/2020 | Li | H04L 5/0057 |
| 2020/0374921 A1 * | 11/2020 | Li | H04W 68/005 |

FOREIGN PATENT DOCUMENTS

| | | | | |
|---|---|---|---|---|
| WO | WO-2018030537 A1 * | 2/2018 | ........... | H04L 1/1812 |
| WO | WO-2020171182 A1 * | 8/2020 | ........... | H04W 48/08 |

OTHER PUBLICATIONS

Z. Zhao et al., "Predictive UAV Base Station Deployment and Service Offloading With Distributed Edge Learning," in IEEE Transactions on Network and Service Management, vol. 18, No. 4, pp. 3955-3972, Dec. 2021, doi: 10.1109/TNSM.2021.3123216. (Year: 2021).*
Office Action for Indian Application No. 202047039612, dated Sep. 10, 2021, 6 pages.
International Search Report and Written Opinion for International Application No. PCT/EP2018/053875, dated Oct. 12, 2018, 9 pages.
Office Action for European Application No. 18706697.2, dated Feb. 25, 2022, 5 pages.

* cited by examiner

SUPPORT FOR RECEIVE-LIMITED USER EQUIPMENT IN WIRELESS ENVIRONMENTS

CROSS-REFERENCE TO RELATED APPLICATIONS

This application is a national stage entry of International Application No. PCT/EP2018/053875, filed Feb. 16, 2018, entitled "SUPPORT FOR RECEIVE-LIMITED USER EQUIPMENT IN WIRELESS ENVIRONMENTS" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services. BSs in 5G/NR may be referred to as gNBs.

SUMMARY

According to an example embodiment, a method includes receiving, by a user device from a base station, information indicating that support for a receive limited user device is enabled based on a presence of a threshold number of receive limited user devices within a range of a cell of the base station, wherein a receive limited user device is unable to receive a transmission that was transmitted based on one or more communication capabilities of a full set of communication capabilities; selecting, by the user device in response to the receiving, one or more communication capabilities to support a receive limited user device; and transmitting, by the user device, information using the selected one or more communication capabilities.

According to an example embodiment, an apparatus includes at least one processor and at least one memory including computer instructions, when executed by the at least one processor, cause the apparatus to: receive, by a user device from a base station, information indicating that support for a receive limited user device is enabled based on a presence of a threshold number of receive limited user devices within a range of a cell of the base station, wherein a receive limited user device is unable to receive a transmission that was transmitted based on one or more communication capabilities of a full set of communication capabilities; select, by the user device in response to the receiving, one or more communication capabilities to support a receive limited user device; and transmit, by the user device, information using the selected one or more communication capabilities.

According to an example embodiment, a computer program product includes a computer-readable storage medium and storing executable code that, when executed by at least one data processing apparatus, is configured to cause the at least one data processing apparatus to perform a method including: receiving, by a user device from a base station, information indicating that support for a receive limited user device is enabled based on a presence of a threshold number of receive limited user devices within a range of a cell of the base station, wherein a receive limited user device is unable to receive a transmission that was transmitted based on one or more communication capabilities of a full set of communication capabilities; selecting, by the user device in response to the receiving, one or more communication capabilities to support a receive limited user device; and transmitting, by the user device, information using the selected one or more communication capabilities.

According to an example embodiment, a method includes receiving, by a receive limited user device from a base station, a paging message that includes a service identifier associated with a service, wherein a receive limited user device is unable to receive a transmission that was transmitted based on one or more communication capabilities of a full set of communication capabilities; and transmitting, by the receive limited user device to the base station, information indicating that the receive limited user device is a receive limited user device and is interested in receiving data of the service associated with the service identifier.

According to an example embodiment, an apparatus includes at least one processor and at least one memory including computer instructions, when executed by the at least one processor, cause the apparatus to: receive, by a receive limited user device from a base station, a paging message that includes a service identifier associated with a service, wherein a receive limited user device is unable to receive a transmission that was transmitted based on one or more communication capabilities of a full set of communication capabilities; and transmit, by the receive limited user device to the base station, information indicating that the receive limited user device is a receive limited user device and is interested in receiving data of the service associated with the service identifier.

According to an example embodiment, a computer program product includes a computer-readable storage medium and storing executable code that, when executed by at least one data processing apparatus, is configured to cause the at least one data processing apparatus to perform a method including: receiving, by a receive limited user device from a base station, a paging message that includes a service identifier associated with a service, wherein a receive limited user device is unable to receive a transmission that was transmitted based on one or more communication capabilities of a full set of communication capabilities; and transmitting, by the receive limited user device to the base station, information indicating that the receive limited user device is a receive limited user device and is interested in receiving data of the service associated with the service identifier.

According to an example embodiment, a method includes determining, by a base station, that a threshold number of receive limited user devices are present within a range of one or more cells of the base station, wherein a receive limited user device is unable to receive a transmission that was transmitted based on one or more communication capabilities of a full set of communication capabilities; and transmitting, by the base station, information indicating that support for a receive limited user device is enabled based on a presence of a threshold number of receive limited user devices within a range of a cell of the base station.

According to an example embodiment, an apparatus includes at least one processor and at least one memory including computer instructions, when executed by the at least one processor, cause the apparatus to: determine, by a base station, that a threshold number of receive limited user devices are present within a range of one or more cells of the base station, wherein a receive limited user device is unable to receive a transmission that was transmitted based on one or more communication capabilities of a full set of communication capabilities; and transmit, by the base station, information indicating that support for a receive limited user device is enabled based on a presence of a threshold number of receive limited user devices within a range of a cell of the base station.

According to an example embodiment, a computer program product includes a computer-readable storage medium and storing executable code that, when executed by at least one data processing apparatus, is configured to cause the at least one data processing apparatus to perform a method including: determining, by a base station, that a threshold number of receive limited user devices are present within a range of one or more cells of the base station, wherein a receive limited user device is unable to receive a transmission that was transmitted based on one or more communication capabilities of a full set of communication capabilities; and transmitting, by the base station, information indicating that support for a receive limited user device is enabled based on a presence of a threshold number of receive limited user devices within a range of a cell of the base station.

The details of one or more examples of embodiments are set forth in the accompanying drawings and the description below. Other features will be apparent from the description and drawings, and from the claims.

DETAILED DESCRIPTION

Figure 1:
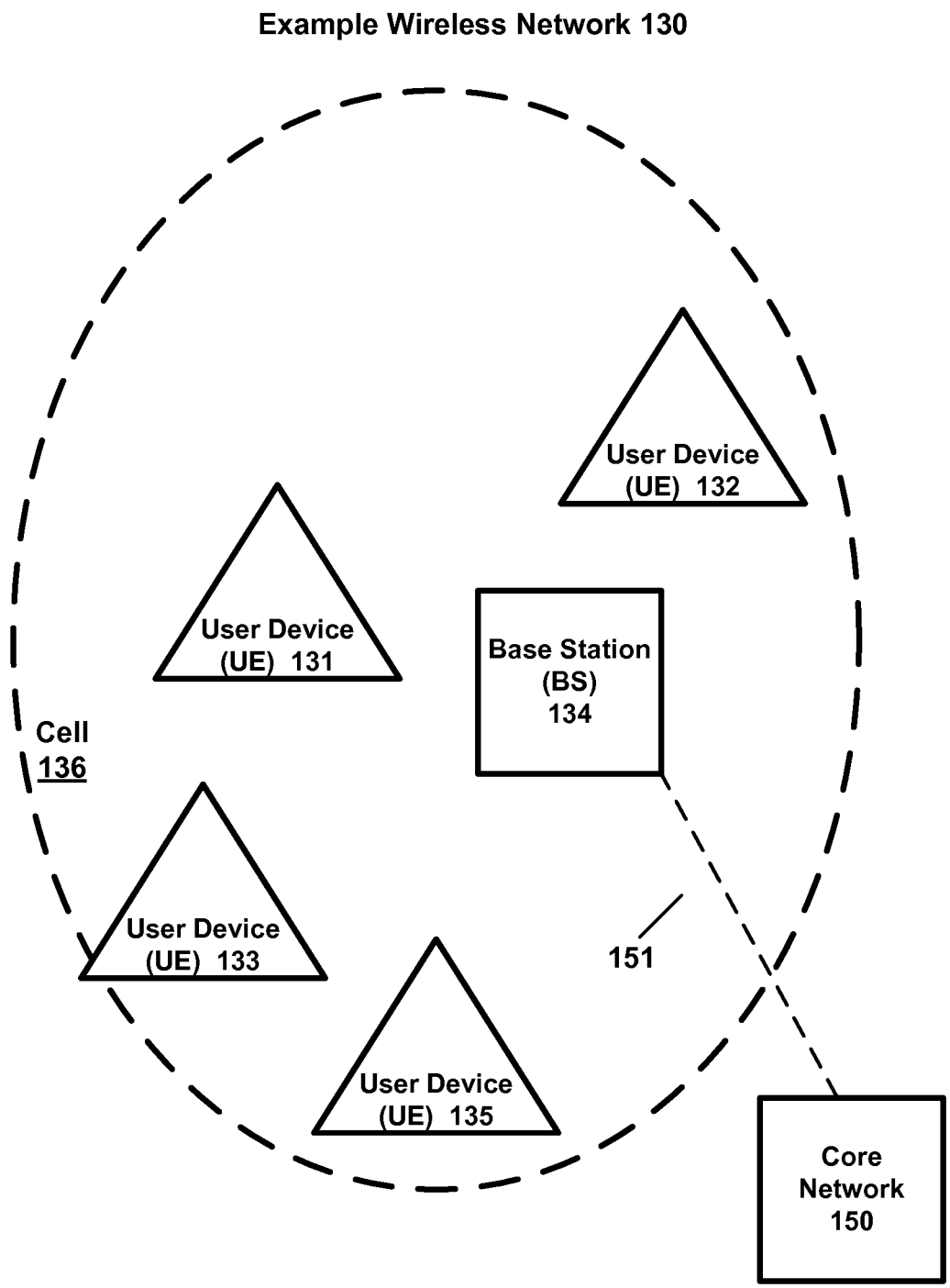
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) or gNB may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via e.g., a S1 interface in LTE (or a NG interface in 5G/NR) 151. This is merely one simple example of a wireless network, and others may be used.

In addition, two UEs may directly communicate via a sidelink (SL) connection, which may also be referred to as a device-to-device (D2D) connection or proximity services (ProSe) connection.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, according to an example embodiment, two UEs may directly communicate via a sidelink (SL) connection, which may also be referred to as a device-to-device (D2D) connection or a proximity services (ProSe) connection, for example. For example, a SL connection between two (or more) UEs may be used by UEs to communicate with each other, e.g., either instead of a Uu (BS-UE) (e.g., a cellular) connection, or in addition to a Uu (BS-UE) connection. A sidelink communication may typically involve a direct communication between UEs (e.g., between a transmit UE that is transmitting a signal via a sidelink connection and one or more receive UEs that are receiving the sidelink transmission), and does not require communication via a base station (BS). Thus, a sidelink communication may involve a message or information being transmitted between two (or more) SL UEs that are within range of each other.

In an illustrative example embodiment, sidelink (SL) connections (e.g., a sidelink connection between UEs) may be used to support a variety of Vehicle-to-everything (V2X) communications or V2X applications or services. V2X may refer to, for example, the passing of information from a vehicle to any entity that may affect (or be related to) the vehicle, and vice versa, and may include, for example, specific types of communication, such as V2I (Vehicle-to-Infrastructure), V2V (Vehicle-to-vehicle), V2P (Vehicle-to-Pedestrian), V2D (Vehicle-to-device) and V2G (Vehicle-to-grid), etc.

Sidelink connections may be used to support a variety of sidelink services or V2X services, such as, for example: V2X safety services, V2X non-safety services, and/or other services. For example, A UE may provide, e.g., to one or more other UEs via sidelink connections/communications, a V2X service, including the transmission of data or information for each of one or more V2X services, such as for one or more of, e.g., a platooning service, an advanced driving service, a remote driving service, a remote parking service, a cooperative maneuver service such as lane merge, a cooperative perception service such as a see-through service, etc., or other V2X services.

Multimedia Broadcast Multicast Services (MBMS) is a point-to-multipoint wireless technology to provide efficient delivery of broadcast and multicast services, both within a cell as well as within the core network.

Figure 2:
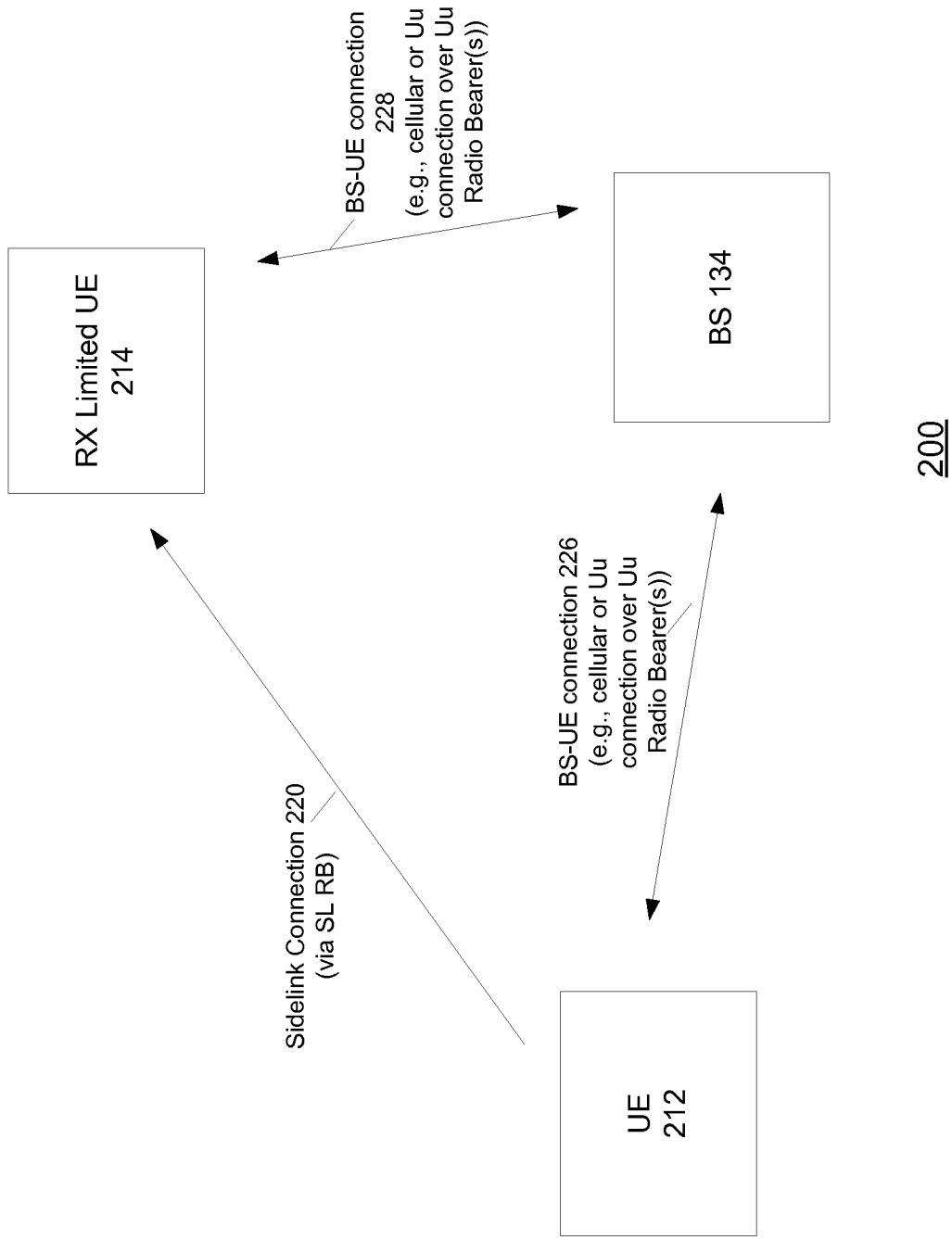
FIG. 2 is a diagram illustrating a wireless network according to another example embodiment.

FIG. 2 is a diagram illustrating a wireless network according to another example embodiment. A BS 134 may be in communication with or connected to multiple UEs, such as to UEs 212 and 214, as examples. For example, BS 134 may be in communication with UE 212 via a BS-UE connection 226 (which may be provided via a Uu or BS-UE radio bearer), while BS 134 may be in communication with UE 214 via a BS-UE connection 228 (which may be provided via a Uu or BS-UE radio bearer). In addition, UEs 212 and 214 may be connected to each other via one or more sidelink (SL) connections, such as via SL connection 220 (which may be provided via a SL radio bearer). For example, UE 212 may transmit data to UE 214 as part of a V2X service via sidelink connection 220.

According to an example embodiment, a UE may transmit and/or receive data or signals using a set of communication capabilities (e.g., which may include one or more communication capabilities, parameters or features). A wide variety of capabilities may be configured or used for transmission and/or reception of data or signals, such as between UEs as part of a sidelink connection or as part of providing a V2X service, for example. For example, communication capabilities may include one or more communication (e.g., transmission and/or reception) parameters, features or configuration(s) that may be used to transmit or receive a signal, and may include capabilities such as, e.g., a modulation and coding scheme (MCS) used to transmit or receive a signal, a number of carriers (e.g., one carrier or a number of carriers that may be used for multi-carrier communication) that are supported for transmitting or receiving a signal, a transmission power, one or more transmission time interval sizes, frame formats or other communication configurations (or configuration parameters) that may be used to transmit or receive signals, and/or other communication capabilities.

In some cases, a UE (or other network node) may transmit a signal (e.g., data or control information) for a service (e.g., V2X service) that may use a communication (e.g., transmission) capability that is not supported by a UE (e.g., which may be referred to as a receive UE) that is interested in receiving data for the service. Thus, such an incompatibility between communication capabilities used by a transmit UE to transmit data (or other signals) for a service and the capabilities of a receive UE may prevent the receive UE from receiving data associated with the provided or transmitted service.

Thus, for example, a UE that is not capable of supporting a set of communication capabilities that are used or may be used by a transmit UE to transmit data for a service may be referred to as a receive limited UE (e.g., because such receive limited UE may only support a limited set of communication capabilities, and not a full set of communication capabilities that may be used by a transmit UE to transmit a signal). For example, there may be one or more communication capabilities that are not supported by the receive limited UE. And, a transmit node (e.g., a transmit UE) may use one or more of these communication capabilities (which are not supported by a receive limited UE) to transmit signals or data to provide a V2X service, or other service. Thus, in such a case (the use by the transmit UE of an unsupported communication capability to transmit a signal), this may prevent the receive limited UE from receiving this V2X service (e.g., where the V2X service includes data transmitted by the transmit UE that is providing the V2X service, for example).

Therefore, for example, a receive limited UE may support only a limited set of communication capabilities that may typically be less than a full set of communication capabilities, and wherein the receive limited UE may be unable to receive a transmission that was transmitted based on one or more (e.g., unsupported) communication capabilities of the full set of communication capabilities that are not part of the limited set of communication capabilities. For example, there may be one or more communication capabilities of the full set of communication capabilities that are not part of the limited set of communication capabilities which are supported by the UE.

By way of illustrative example, there may be one or more communication capabilities that may be unsupported (not supported) by a receive limited UE(s), such as, for example one or more capabilities that may be used to send or receive V2X services over a sidelink connection (also a set of communication capabilities may also be provided for MBMS, and may result in a receive limited UE for MBMS services). While various examples are illustrated with respect to D2D or V2x services, the example embodiments may be applicable to other types of services, such as MBMS services. Some example communication capabilities that may not (necessarily) be supported by a receive limited UE may include, by way of illustrative example, one or more of the following:

1) A capability to simultaneously transmit or receive a threshold number (e.g., 8, or other number) or more of carriers (e.g., for sidelink communications, MBMS, or other communications). Thus, in this example, a receive limited UE may include only one or two receiver chains (or receive chains), and thus, may only be able to simultaneously receive only 1 carrier or 2 carriers, by way of example. Thus, for example, the number of receiver chains (or receive chains) provided or included within a UE may limit the UE's ability to simultaneously receive multiple carriers. In an illustrative example, a receiver (or receive) chain may include one or more circuits or components as part of a radio receiver, e.g., such as one or more of an antenna, demodulator, filter, amplifier(s), signal processing circuit, and/or other circuits or components that may be used to receive a transmitted signal. Thus, in some cases, a UE may be considered to be a receive limited UE if the UE is unable to simultaneously receive at least a threshold number of carriers (e.g., where the threshold number may be 2, 3, . . . 8, or other number).

Thus, a receive limited UE may not have the ability to simultaneously monitor or receive V2X services (signals or data transmitted for each of such V2X services) on a threshold number (or more) of different carriers, for example (where the threshold number may vary depending on the UE and/or technology used, and/or number of receive chains used by a UE, or a number of simultaneous carriers that a specification or standard indicates should be supported or simultaneously receivable by a UE).

In some cases, a set of carriers may be assigned or allocated by a BS or network for each V2X service, e.g., carrier 1, carrier 2 and carrier 3, and a priority may be assigned to each of these carrier (e.g., carrier 1 may be assigned as the highest priority carrier for use for the service, carrier 2 may be a next highest priority carrier for the service, and carrier 3 may be the lowest priority carrier for the service among the 3 carriers assigned or allocated for transmitting data or signals for this service). However, if the transmit UE transmits data for a V2X service on any of the assigned carriers, then the receive UE may be unable to receive such V2X service (since the receive limited UE may be unable to simultaneously receive or monitor multiple or all 3 carriers, and may not know the carrier that the transmit UE will likely use for transmission). Also, for example, a receive limited UE, which is unable to simultaneously receive multiple carriers, may be unable to simultaneously receive signals for multiple (or more than a threshold number of) V2X services, e.g., for both a V2X safety service (e.g., related to self-driving or vehicle monitoring, or road monitoring, . . . ), and a V2X non-safety service (e.g., related to general information or entertainment, movies, education, or other non-safety related V2X service), and/or the receive limited UE may be forced to select one of several safety services. While various examples herein may use the ability to simultaneously monitor or receive multiple (at least a threshold number of) carriers as an example communication capability that may not be supported by some receive limited UEs, other types of communication capabilities may also be unsupported by a receive limited UE.

2) Another example communication capability that may not be supported by a receive limited UE may include a capability to use a specific modulation and coding scheme (MCS) for sidelink communications, such as one or more higher level MCS, e.g., 64-QAM (64-quadrature amplitude modulation), or other MCS. Thus, for example, in the event a UE modulates and/or transmits a signal (e.g., data) using such unsupported MCS (e.g., 64-QAM), a receive limited UE (which does not support 64-QAM in this example) may typically be unable to receive and/or decode such a signal or data.

3) Another example communication capability that may not be supported by a receive limited UE may include a capability to support transmit diversity for sidelink communications. Thus, in such a case, a receive limited UE would be unable to receive and/or decode such a signal transmitted for a V2X service using transmit diversity; and 4) Another example communication capability that may not be supported by a receive limited UE may include a transmission time interval (TTI) of a specific size for sidelink communications. For example, a receive limited UE may only support a long TTI (e.g., a 1 ms TTI), and may be unable to support a short (or shorter) TTI (e.g., a TTI of 0.5 ms or 0.25 ms). Thus, a receive limited UE may typically be unable to receive a signal or data transmitted using such an unsupported TTI. These are merely a few examples of unsupported communication capabilities (communication capabilities that may not necessarily be supported by a receive limited UE), and many other communication capabilities may be used or provided (or other communication capabilities may be unsupported by a receive limited UE).

According to an example embodiment, a problem may arise as to how to support one or more received limited UEs (e.g., how to support communication between a UE(s) that is not limited and a receive limited UE, so that the communication capabilities, including as a transmit configuration of capabilities used by a transmit UE and a receive configuration of capabilities or features used by a receive limited UE, are compatible). For example, simply permanently disabling all the unsupported communication capabilities (the communication capabilities not supported by a receive limited UE) may avoid an incompatibility between a transmit UE and a receive limited UE, but would not provide the advantages (e.g., speed, throughput, efficiency, . . . ) that may be provided by one or more of these unsupported communication capabilities.

Therefore, according to an example embodiment, a more flexible and adaptable approach may be provided, e.g., in which unsupported communication capabilities may be selectively disabled (or a transmit configuration may be selected that may avoid use of communication capabilities that are not supported by receive limited UE) by transmit UEs when one or more receive limited UEs are present within range of a cell(s) and/or within SL communication range, in order to support the receive limited UEs. Also, for example, when it determined that a UE is within range of a cell or BS, this may also provide an indication or an estimate that the UE may be within range of one or more or even all other UEs within the cell, for example, depending on cell size and location of UEs.

For example, support of receive limited UEs may be accomplished via the selective and on-demand disabling of (e.g., one or more, or a set of) communication capabilities within a cell in response to the presence of a receive limited UE(s) that are present within range of the cell may be general (e.g., general for one or more or even all services and/or all capabilities). Thus, for example, in response to a transmit UE receiving an indication (e.g., via transmission of system information or other broadcast or transmission) of information indicating that support for receive limited UE has been enabled (e.g., for a cell), the transmit UE may select communication capabilities (or a transmission configuration) that avoids use of a set of one or more (or maybe even all possible) unsupported communication capabilities. Thus, for this case, a transmit UE within the cell may select or configure for use a set of communication (e.g., transmission) capabilities that may avoid one or more (e.g., or a set) of unsupported communication capabilities in order to support receive limited UEs (e.g., in order to transmit data via SL so as to allow a receive limited UE to receive such SL transmission, such as for one or more or even all services offered within the cell). Thus, in this manner, this approach provides a technical advantage of selectively providing support for receive limited UE when needed, e.g., when such a receive limited UE is present within range of the cell (which may be presumed to be within range of a transmit UE within the cell).

Alternatively, a finer granulation of support for receive limited UEs may be provided or enabled (e.g., activated) by providing support for receive limited UEs (e.g., by disabling communication capabilities or otherwise configuring communication capabilities) that are specific to an unsupported communication capability (e.g., specific to a capability that is not supported by a receive limited UE within range of the cell) and/or specific to a service (e.g., a specific V2X service) that the receive limited UE within range of the cell (within SL range of other UEs) is receiving or interested in receiving or monitoring. For example, receive limited UEs may indicate to a BS that the UE is a receive limited UE. Also, the receive limited UE may also indicate one or more services (e.g., V2X or SL service 1, V2X or SL service 2, . . . ) that the UE is interested in receiving, and/or may identify one or more communication capabilities that the receive limited UE does not support. The BS may then, for example, indicate (e.g., via broadcast of system information or transmission of other information) that support for a receive limited UE has been enabled (e.g., activated) for each of one or more services and/or for each of one or more unsupported communication capabilities. Thus, for example, a receive limited UE may indicate or report to a BS that it is a receive limited UE with respect to capability 1, and is interested in receiving service 1. The BS may notify, e.g., by transmission of system information, or other transmission of information, that service 1 is enabled for receive limited UEs with respect to capability 1 (e.g., 64-QAM is not supported by a receive limited UE for service 1). However, the other services and/or other capabilities would not be affected (no capability limitations for those other capabilities or services), under this illustrative example. In response to receiving this information, any transmit UE providing service 1 would therefore avoid use of (or not use) the unsupported communication capability (e.g., a transmit UE providing V2X service 1 would select a MCS less than 64-QAM, or different from 64-QAM), in order to support receive limited UE for those circumstances. Also, the same or a different transmit UE providing different services (e.g., V2X service 2 and V2X service 3) would not need to limit or avoid any unsupported capabilities, in this illustrative example where there is only one capability (capability 1) and service (service 1) that are indicated by the BS for receive limited UE support. And, the transmit UE providing service 1 would not need to avoid providing any other capabilities (unless there were additional receive limited UEs that required such changes (capability limitations) to be made in order to support them within the cell). Thus, in this manner, this alternative approach (that provides a service specific and/or capability specific enablement of receive limited UE support) provides the technical advantage of even more selectively (e.g., per service and/or per communication capability) providing support for receive limited UE when needed, e.g., when such a receive limited UE is present within range of the cell, and only for specifically requested (or used) services and/or unsupported capabilities, as required by any receive limited UEs within range of the cell.

Figure 3:
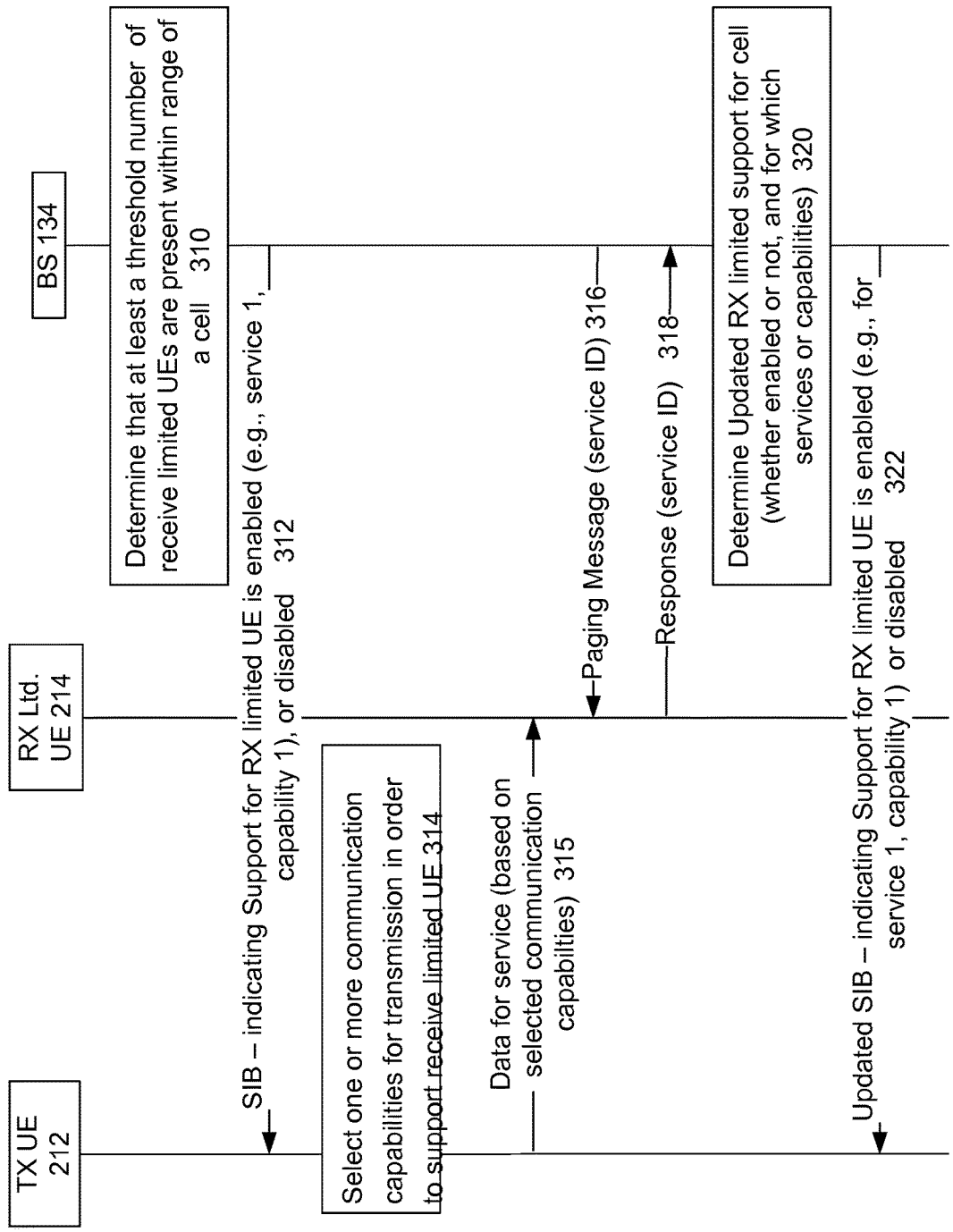
FIG. 3 is a diagram illustrating a network according to another example embodiment.

FIG. 3 is a diagram illustrating operation of a network according to an example embodiment. At 310, according to an example embodiment, a BS 134 may determine that at least a threshold number (e.g., 1, 2, 3 or other number) of receive limited UEs are present within range of a cell(s) of the BS, e.g., based on capabilities indications provided by UEs when connecting or performing random access procedure with the BS, or via paging response, or via reception of other information indicating that the UE is a receive limited UE. The UE may also indicate one or more services of interest, and/or may indicate one or more communication capabilities that the receive limited UE does not support, according to example embodiments.

At 312 (FIG. 3), according to an example embodiment, the BS 134 may broadcast (e.g., via system information block (SIB) for V2X or by transmitting other information e.g., via dedicated Radio Resource Control (RRC) signaling), to one or more or all UEs, information indicating that support for a receive limited UE is enabled, e.g., based on a presence of a threshold number (e.g., 1, 2 or other number of UEs) of received limited UEs within range of a cell(s) of the BS. This information (e.g., indicating that support for receive limited UE is enabled in the cell(s)) may be a general indication or may be capability-specific or service-specific. This information indicating support for a receive limited UE may, e.g.: 1) inform transmit UEs that the transmit UE should select (or configure for transmission) one or more communication capabilities for transmission in order to support receive limited UE(s), e.g., for V2X services or sidelink services (e.g., by avoiding the unsupported communication capability, and/or avoiding use of the indicated unsupported capability for the indicated service); and/or 2) inform any receive limited UEs within or monitoring the cell that support for receive limited UEs is enabled within the cell, e.g., for V2X or sidelink services (and/or for the indicated service and/or for an indicated unsupported capability in the event the information indicating support for receive limited UE is capability-specific and/or service-specific).

Thus, at 314, in such case, the transmit UE 212 may configure or select its communication capabilities (e.g., including possibly avoiding one or more communication capabilities that may be disabled or not supported for receive limited UEs) in order to transmit data or a signal that may be receivable by receive limited UEs. At 315, the transmit UE may then transmit data or signals to one or more receive UEs (including a receive limited UE). Also, at 315, in such case, a receive limited UE 214 may then receive the transmitted signal or data for the service, e.g., because receive limited UE is supported within the cell, and the receive limited UE may also select or configure one or more communication capabilities (e.g., receive capabilities or receive configuration) to receive the data for a V2X or SL service of interest, for example.

For example, a receive UE may select a carrier from a plurality of carriers assigned or allocated to a service, by selecting a carrier using carrier priority based carrier selection, e.g., if receive limited UE is supported. That is, for example, if a BS indicates that a cell has enabled support for receive limited UE (or indicates that carrier priority based carrier selection is enabled to support receive limited UEs), then the receive limited UE may receive or monitor a service via the highest priority carrier assigned to that service, for example, because the receive limited UE knows that the transmit UE will also apply carrier priority based carrier selection to select a carrier (e.g., carrier 1) to transmit on for the service, e.g., likely selecting and using the highest priority carrier (e.g., carrier 1) assigned to the service. The receive UE may, or may not, monitor the load of the highest priority carrier, and thus, may or may not switch to a lower priority carrier to continue receiving the service in response to a carrier load exceeding a threshold. Alternatively, the transmit UE may send a SL message to one or more receive UEs (e.g., including a receive limited UE) indicating the carrier that will be used, and then may send out another message indicating that the transmit UE will switch to the second highest priority carrier (e.g., carrier 2), which may be in response to the transmit UE detecting a load on the priority carrier that exceeds a threshold, for example. In such case, a receive limited UE may also switch to continue receiving the service via carrier 2, for example.

According to an illustrative example embodiment, e.g., in response to receiving information indicating support for receive limited UE has been enabled, a transmit UE (or a receive limited UE) may select one or more communication capabilities to support a receive limited UE, including one or more of:

1) Selecting, by a UE, a carrier from a plurality of carriers using carrier priority based carrier selection based on receiving an indication that carrier priority based carrier selection is enabled or based on an indication that a receive limited user device is present that is unable to simultaneously receive a threshold number or more of carriers (by selecting a carrier based on carrier priority, this allows the transmit UE and receive limited UE to know the likely carrier (highest priority carrier within the set of allocated carriers for the service) that the transmit UE will use to transmit the SL or V2X service, or other service. For example, in an example embodiment, a carrier priority based carrier selection may allow a UE to select a carrier for transmission of a service based on the carrier priority and carrier load. Initially, the transmit UE may select the highest priority carrier (e.g., carrier 1) for transmission of the service, and may switch to use a next highest carrier (e.g., carrier 2) for transmission of the service only if the highest priority carrier has exceeded a threshold load (e.g., where load may be measured a variety of different ways, such as users, resource usage for resources, CBR measurement, . . . ). Also, the network/BS may adjust the threshold load value for the highest priority carrier so as to make it more likely that the highest priority carrier will be used, and less likely that the transmit UE will switch to the next highest priority carrier. Thus, by a BS indicating, by a transmission such as system information block (SIB) associated with V2X or SL services, that support for receive limited UE has been enabled for the cell, e.g., based on presence of a receive limited UE within range of the cell (or alternatively, by the BS indicating that carrier priority based carrier selection has been enabled, or enabled for a specific service), the transmit UE will typically transmit on the highest priority carrier (e.g., carrier 1), and the receive limited UE will receive or monitor the service on carrier 1, thereby providing compatibility between transmit UE and receive UE to allow the receive limited UE to receive this service, even though such receive limited UE may be unable to simultaneously receive multiple (or more than a threshold number) of carriers. In this manner, enabling support for a receive limited UE by enabling carrier priority based carrier selection may make it easier or possible for a receive limited UE to determine a carrier that a service will most likely be transmitted on (e.g., carrier 1), thus avoiding the situation where the receive limited UE may need to monitor multiple carriers (e.g., carrier 1, 2 and 3) in order to receive such service, since in this illustrative example, the receive limited UE may be unable to simultaneously receive all three carriers, and thus would miss or not receive such service in the absence of such support for receive limited UE.

2) Selecting, by a UE, a modulation and coding schemes (MCS) for transmission out of a set of modulation and coding schemes (MCS) that do not include the specific unsupported modulation and coding scheme (MCS) (e.g., 64-QAM) based on receiving an indication that the specific modulation and coding scheme (MCS) is disabled.

3) Selecting, by a user device, not to use transmit diversity for transmission based on an indication that transmit diversity is disabled; and 4) Selecting, by a user device, not to use the specific size transmission time interval (TTI) for transmission based on receiving an indication that the specific size TTI is disabled. In this case, the transmit UE would select a different TTI size for transmitting the service, which is compatible with the receive limited UE.

At 316, according to an example embodiment, in order to obtain updated status as to presence of one or more receive limited UEs within a cell (e.g., to determine whether or not there are any receive limited UEs within a cell), a BS 134 may transmit or broadcast a paging message to UEs within the cell. In an example embodiment, the paging message may include a service identifier (Service ID) (such as an address or portion of an address) associated with or used to identify a service. A receive limited UE 214 may monitor paging messages for service identifiers for services the receive limited UE is receiving or interested in receiving (a service of interest, such as a sidelink service or V2X service).

At 318, in response to receiving a paging message with a service identifier associated with or identifying a service of interest, the receive limited UE 214 may transmit information indicating that the receive limited UE is a receive limited UE and the service identifier is associated with a service of interest (the receive UE is interested in receiving data for the identified service). This information sent from receive limited UE to the BS may provide the service identifier of the service of interest and may thus inform (e.g., may implicitly inform the BS by sending the service identifier back to the BS) the BS that there is at least one receive limited UE that is interested in receiving the identified service.

In addition, the receive limited UE may also identify one or more communication capabilities (e.g., that the receive limited UE does not support). The BS may then transmit, e.g., via SIB broadcast, information indicating that receive limited UE support is enabled for the BS or cell, e.g., based on presence of a receive limited UE within range of the cell. This information indicating that receive limited UE support is enabled may include the service identifier to identify the service for which receive limited UE support is enabled, and may also indicate one or more communication capabilities for which the receive limited UE support has been enabled (e.g., to the extent the receive limited UE may have indicated one or more unsupported communication capabilities).

A receive limited UE may respond to the paging message is various ways, according to different example embodiments. In a first example embodiment, the receive limited UE 214 may send a message (e.g., RRC/Radio Resource Control message) to the BS 134 including information indicating that the receive limited UE is a receive limited UE that is interested in receiving the service, e.g., by providing the service identifier. The receive limited UE may also indicate one or more communication capabilities that the UE does not support. If the receive limited UE is in RRC idle state, the receive limited UE may first transition from idle to connected state (e.g., by connecting to the BS or performing a Random Access Procedure) before sending the message to the BS. In a second example embodiment, the receive limited UE 214 may respond to the paging message by transmitting a random access request using a receive limited associated random access preamble to indicate that the receive limited UE is a receive limited UE and is interested in receiving data of the service associated with the service identifier. For example, the random access preamble may be a general receive limited preamble for all services, or may be a receive limited associated preamble that is associated with the indicated service/service identifier, e.g., to indicate a request to receive data for the indicated service. The random access preamble may be a general receive limited associated preamble for all the unsupported communication capabilities, or may be a receive limited associated preamble that is associated with one specific unsupported communication capability (or associated with a subset of unsupported communication capabilities). In a third example embodiment, the receive limited UE may transmit via sidelink communication information indicating that the receive limited UE is a receive limited UE and is interested in receiving the service (e.g., by providing the service identifier, and possibly identifying an unsupported communication capability). In such third example, the BS may directly receive such sidelink communication, or another UE (e.g., the transmit UE or other UE) may forward such information to the BS via uplink communication to the BS. Further example embodiments will now be described.

At 320 (FIG. 3), the BS 134 may determine (e.g., based on responses from one or more UEs) updated receive limited UE support for a cell (e.g., whether such receive limited UE support should be enabled or not, and for which services and/or capabilities it is enabled.) At 322, updated SIB (system information block) information may be transmitted or broadcast or dedicated RRC signaling may be transmitted, indicating support for receive limited UE is enabled (or not enabled), and if enabled, indicating for which services and/or capabilities it is enabled for.

As noted, various example embodiments may be described with reference to the communication capability of being able to simultaneously receive multiple or a threshold number of carriers. A receive limited UE may be unable to simultaneously receive multiple (or more than a threshold number of) carriers. And, various transmit UEs may support such receive limited UEs by using carrier priority based carrier selection, e.g., when instructed by the BS, or when informed of a presence of a receive limited UE or when BS indicates that carrier priority based carrier selection has been enabled. Thus, at least some example embodiments may be based on a basic idea of using carrier priority to address a problem of receive limited UEs (that may be unable to simultaneously receive multiple or more than a threshold number of carriers), and some of the example embodiments provide a mechanism to enable the carrier selection based on the carrier priority only when such necessity exists, e.g., based on presence of such receive limited UEs, and in some cases, only for services that are being received by such receive limited UEs that are within range of the cell. Otherwise, this could unnecessarily lead to increased load in the carrier and V2X service performance deterioration. Therefore, the following illustrative example solution is described:

BS may transmit SIB: System Information Block (SIB) (e.g. SIB21) related to V2X may be used to indicate whether carrier priority based carrier selection should be applied or not (enabled/not enabled) based on the presence of receive limited UEs within a cell. For example, SIB may include a flag—receive limited indication—enabled or disabled—to cause transmit UE to transmit on the indicated/prioritized carrier for a service. Such a receive limited indication flag, might be service-specific, this feature may be enabled/disabled for each of multiple services for example. The information broadcast or transmitted (e.g., within SIB) indicating receive limited UE support has been enabled or disabled for a cell or BS may use a general flag or indication (to indicate receive limited support has been enabled or disabled), or a per service flag (e.g., for different services, V2X services, such as 1 or more road safety related services, 1 or more non-safety related services, such as infotainment), and/or a per communication capability flag or indication.

The configuration may include an indication of the services (e.g. identified by destination ID or service ID) and optional the carriers (may identify a carrier or set of carriers (or carriers may be determined in advance by UEs for each service), for which V2X messages/service should be transmitted. A carrier from this set of carriers may be selected when a UE applies carrier priority based carrier selection for the service, for example.

To support eNB/BS awareness of receive limited UE in the cell coverage, the receive limited UE, entering a cell where SIB indicates carrier priority based carrier selection is disabled for a service of interest, may go to RRC Connected mode if the receive limited UE is in RRC idle state to report its receive capability to trigger eNB/BS to update SIB for carrier priority based carrier selection indication (thus BS indicating that support for receive limited UE has been enabled, indicating carrier priority based carrier selection is enabled). Afterwards, UE may go back to Idle state. The SIB based indication can be valid for a certain time period (e.g., controlled by a specific, dedicated timer, or for a known or specified time period) and then receive limited UE may need to indicate the capability again to trigger eNB/BS to transmit SIB indication (indicating that receive limited UE is enabled, e.g., and may also indicate that carrier priority based carrier selection has been enabled). For example, receive limited UE may have reported capabilities to BS, and may have changed locations, or no longer is using a service—thus the support for receive limited UE may be only temporarily enabled, and may require UE to periodically report their receive capabilities to BS). Alternatively, eNB/BS may page idle mode UEs after certain time period to check if there is still any receive limited UE camping in the cell to determine if carrier priority based carrier selection indication in SIB should continue to be configured or released. A new paging message should be used for that purpose indicating to which service ID/destination ID/capability ID or any combination of those IDs the paging relates to (instead of indication of the UE paging ID).

The paging message may be primarily for idle mode UEs (but may also cause connected mode UEs to report their UE receive capabilities or status to the BS. Connected mode UEs can directly report receive limited UE capability via RRC message to BS. Thus, paging to request feedback on this receive limited capability, may be typically directed to idle mode UEs. BS would typically not disable this feature with an active/connected RX limited UE, as it would know the capabilities of each connected UE.

To respond to this paging message, there may be at least three possible ways a UE may respond to the paging message. 1) Interested UE with receive limited capability transitions to RRC Connected state and informs the network/BS it is still interested in receiving the service. 2) receive limited RACH preamble—RACH preamble can be transmitted by UE, e.g., using a dedicated RACH preamble to let BS know there is still receive limited UE camping in the cell and interested to receive the service. The dedicated RACH preambles can be either specified by standardization or indicated in the paging message. 3) A receive limited UE can respond to paging message by sending a new message over sidelink (SL) interface indicating its limited capability and optionally indicating a preferred carrier and service information (preferred carrier and service may also be implicitly determined based on carrier where a signal/message is sent). This could be new or extended PC5 Signaling Protocol message or some pre-defined resources in resource pool to transmit a PHY signal (e.g. some reference signal or RACH preamble) to indicate the receive limited UE capability. If there are multiple such UEs, they can use the same resource to transmit the same signaling as SL transmissions are synchronized. One bit in SL Scheduling Assignment or a special reference signal (DMRS) can be another option. Regardless of the chosen option, the fact of detecting the configured number of receive limited UEs could be then reported by any RRC Connected UE to the network/BS, so that the BS does not disable the carrier priority based carrier selection indication (or so that the BS enables it in case it is currently disabled).

The SL indication on receive limited capability may be used independently with paging response as proposed above. In addition to/instead of BS indication of carrier priority based carrier selection for receive limited UE support, the SL (sidelink) indication on limited capability can be used as well to trigger the transmit UEs in proximity to enable the carrier priority based carrier selection for better support of receive limited UEs' reception of the service.

Various example embodiments may provide a number of technical advantages, such as, providing on-demand (as needed) support within a cell for receive limited UE, and in some cases, with even a finer granularity as receive limited support may be enabled only for indicated services and/or indicated unsupported communication capabilities. For example, a carrier priority based carrier selection may be enabled on as needed basis (e.g., when V-UEs with receive limited capability are available in proximity of cell level or SL transmission range level) so that the unbalanced usage of multiple carriers for the service of interest can be avoided as much as possible, while providing predictability as to likely used carrier for a service when such support for receive limited UE is required. Thus, in turn it reduces the service performance degradation due to unnecessary overload in high priority carrier.

Figure 4:
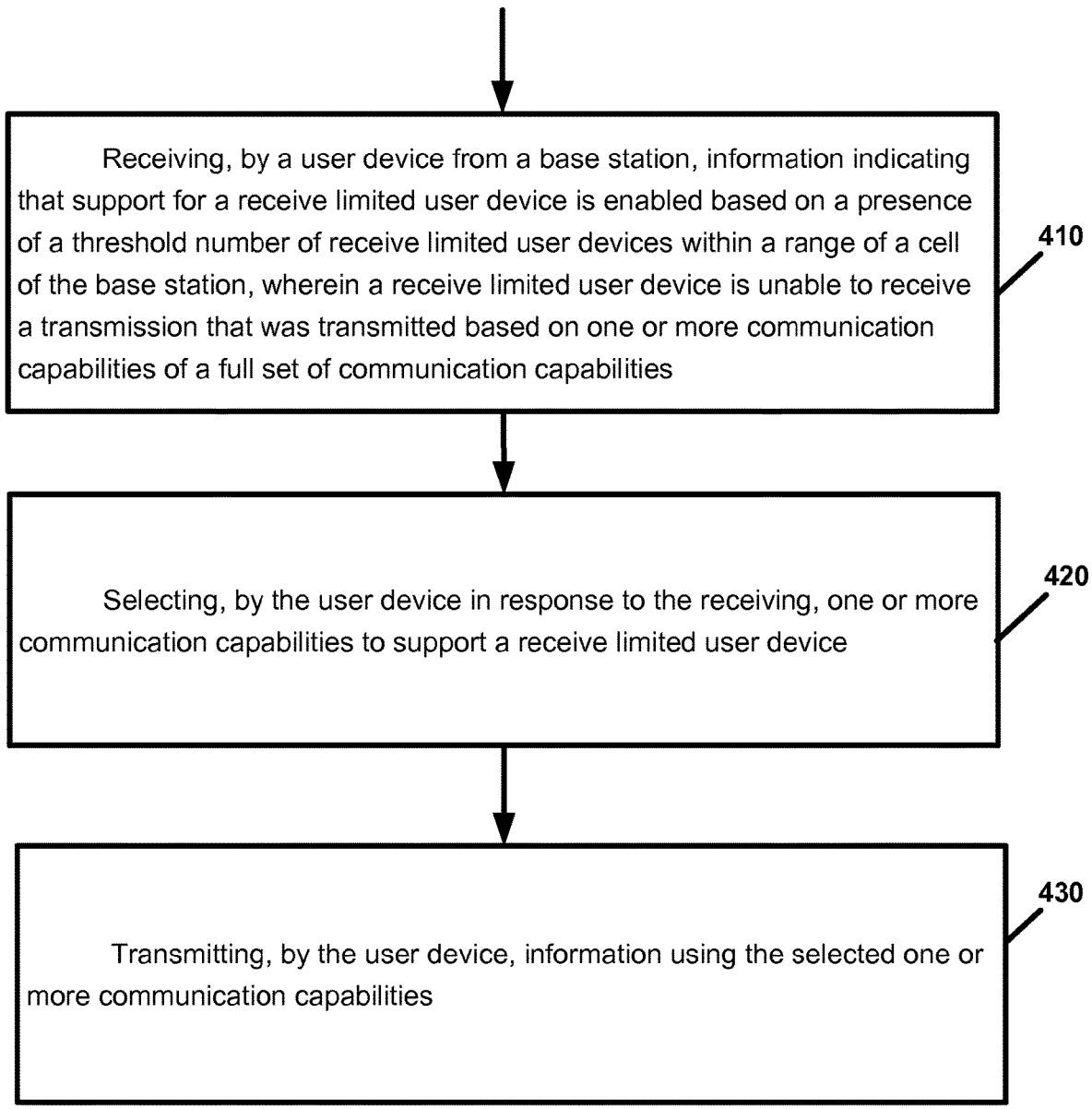
FIG. 4 is a flow chart illustrating operation of a user device according to an example embodiment.

Embodiment 1: FIG. 4 is a flow chart illustrating operation of a user device according to an example embodiment. Operation 410 includes receiving, by a user device from a base station, information indicating that support for a receive limited user device is enabled based on a presence of a threshold number of receive limited user devices within a range of a cell of the base station, wherein a receive limited user device is unable to receive a transmission that was transmitted based on one or more communication capabilities of a full set of communication capabilities. Operation 420 includes selecting, by the user device in response to the receiving, one or more communication capabilities to support a receive limited user device. And, operation 430 includes transmitting, by the user device, information using the selected one or more communication capabilities.

Embodiment 2: According to an example embodiment of embodiment 1, wherein a receive limited user device supports only a limited set of communication capabilities that is less than a full set of communication capabilities, and wherein the receive limited user device is unable to receive a transmission that was transmitted based on one or more communication capabilities of the full set of communication capabilities that are not part of the limited set of communication capabilities.

Embodiment 3: According to an example embodiment of any of embodiments 1-2, wherein the one or more communication capabilities of the full set of communication capabilities that are not part of the limited set of communication capabilities supported by the user device comprise at least one of: simultaneously transmit or receive a threshold number or more of carriers for sidelink communications; a specific modulation and coding scheme (MCS) for sidelink communications; a transmit diversity for sidelink communications; and a transmission time interval (TTI) of a specific size for sidelink communications.

Embodiment 4: According to an example embodiment of any of embodiments 1-3, wherein the selecting one or more communication capabilities comprises at least one of: selecting, by a user device, a carrier from a plurality of carriers using carrier priority based carrier selection based on receiving an indication that carrier priority based carrier selection is enabled or based on an indication that a receive limited user device is present that is unable to simultaneously receive a threshold number or more of carriers; selecting, by a user device, a modulation and coding schemes (MCS) for transmission out of a set of modulation and coding schemes (MCS) that does not include the specific modulation and coding scheme (MCS) based on receiving an indication that the specific modulation and coding scheme (MCS) is disabled; selecting, by a user device, not to use transmit diversity for transmission based on an indication that transmit diversity is disabled; and selecting, by a user device, not to use the specific size transmission time interval (TTI) for transmission based on receiving an indication that the specific size TTI is disabled.

Embodiment 5: According to an example embodiment of any of embodiments 1-4, wherein the selecting, by the user device, one or more communication capabilities to support a receive limited user device comprises selecting, by the user device, one or more communication capabilities for a sidelink service, including selecting one or more of the following communication capabilities for a sidelink service(s), wherein one or more of the communication capabilities are selectable per sidelink service: selecting, by a user device for a sidelink service, a carrier for a sidelink transmission for the sidelink service from a plurality of carriers using carrier priority based carrier selection based on receiving an indication that carrier priority based carrier selection is enabled for the sidelink service or based on an indication that a receive limited user device that is interested in receiving the sidelink service is present that is unable to simultaneously receive a threshold number or more of carriers; selecting, by a user device for a sidelink service, a modulation and coding scheme (MCS) for a sidelink transmission for the sidelink service out of a set of modulation and coding schemes (MCS) that does not include the specific modulation and coding scheme (MCS) based on receiving an indication that the specific modulation and coding scheme (MCS) is disabled for the sidelink service; selecting, by a user device for a sidelink service, not to use transmit diversity for a sidelink transmission for the sidelink service based on an indication that transmit diversity is disabled for the sidelink service; and selecting, by a user device for a service, not to use the specific size transmission time interval (TTI) for a sidelink transmission for the sidelink service based on receiving an indication that the specific size TTI is disabled for the sidelink service.

Embodiment 6: According to an example embodiment of any of embodiments 1-5, wherein the information indicating that support for a receive limited user device is enabled is received by the user device via a system information block (SIB) associated with sidelink services or vehicle-to-everything (V2X) services.

Embodiment 7: According to an example embodiment of any of embodiments 1-6, wherein the receiving comprises: receiving, by a user device from a base station, information indicating that support for a receive limited user device for one or more sidelink services or vehicle-to-everything (V2X) services is enabled based on a presence of a threshold number of receive limited user devices within a range of a cell of the base station.

Embodiment 8: According to an example embodiment of any of embodiments 1-7, wherein, in response to receiving the information, the support of receive limited user device is enabled for a specific time period.

Embodiment 9: According to an example embodiment of any of embodiments 1-8, wherein the receiving comprises receiving at least one of an indication that carrier priority based carrier selection is enabled for a sidelink service or an indication that a receive limited user device that is interested in receiving the sidelink service is present that is unable to simultaneously receive a threshold number or more of carriers; and wherein the selecting comprises selecting, by the user device, a carrier for a sidelink transmission for the sidelink service from a plurality of carriers using carrier priority based carrier selection.

Figure 5:
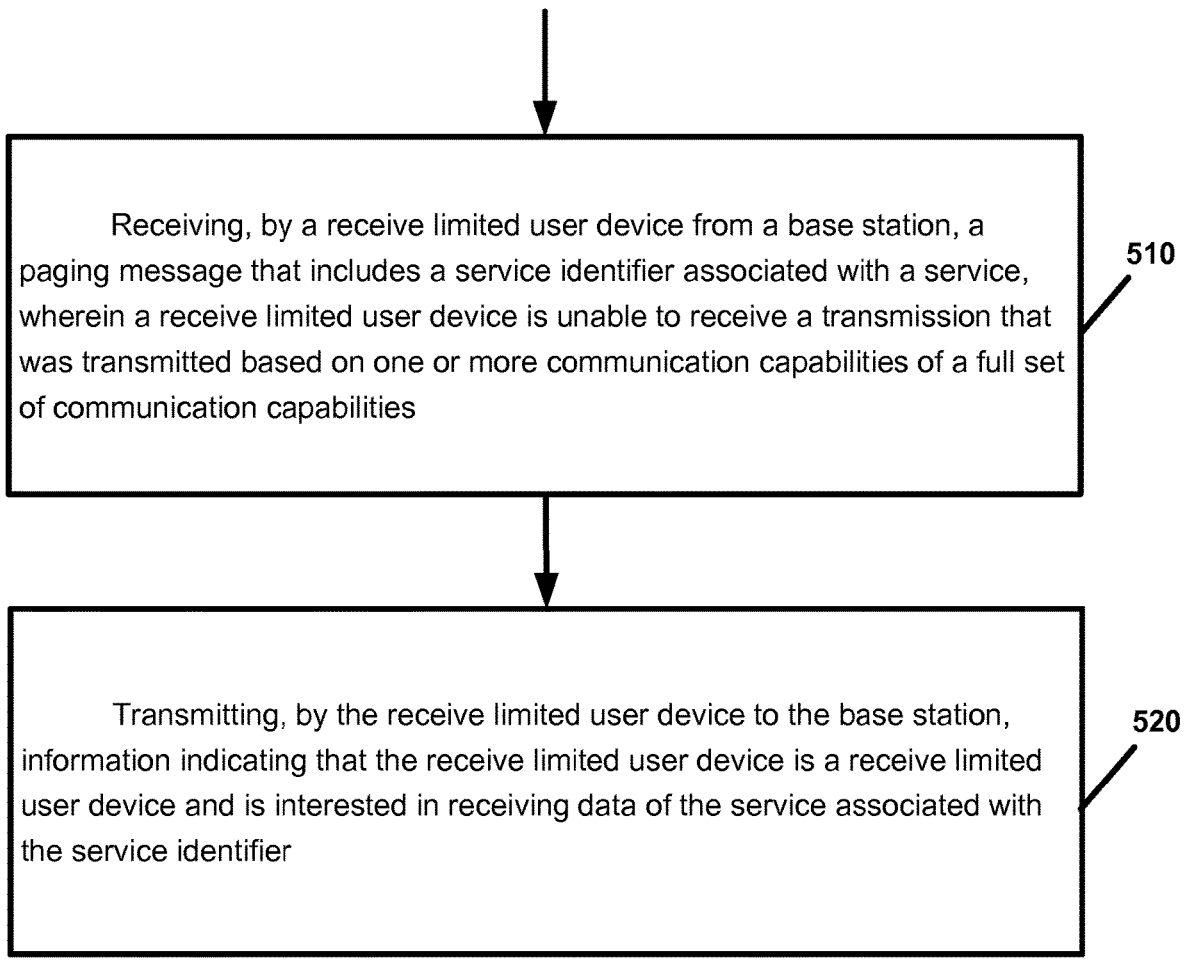
FIG. 5 is a flow chart illustrating operation of a user device according to another example embodiment.

Embodiment 10: FIG. 5 is a flow chart illustrating operation of a user device according to another example implementation. Operation 510 includes receiving, by a receive limited user device from a base station, a paging message that includes a service identifier associated with a service, wherein a receive limited user device is unable to receive a transmission that was transmitted based on one or more communication capabilities of a full set of communication capabilities. And, operation 520 includes transmitting, by the receive limited user device to the base station, information indicating that the receive limited user device is a receive limited user device and is interested in receiving data of the service associated with the service identifier.

Embodiment 11: According to an example embodiment of embodiment 10, and further comprising: receiving, by the receive limited user device from the base station, information indicating that support of receive limited user device is enabled for the service.

Embodiment 12: According to an example embodiment of any of embodiments 10-11, wherein the paging message includes a service identifier associated with a sidelink service; and wherein the transmitting comprises transmitting, by the receive limited user device to the base station, information indicating that the receive limited user device is a receive limited user device and is interested in receiving data of the sidelink service associated with the service identifier, wherein the information also indicating one or more of the communication capabilities that the user device does not support.

Embodiment 13: According to an example embodiment of any of embodiments 10-12, wherein the one or more communication capabilities of the full set of communication capabilities that are not supported by the user device comprise at least one of: simultaneously transmit or receive a threshold number or more of carriers for sidelink communications; a specific modulation and coding scheme (MCS) for sidelink communications; a transmit diversity for sidelink communications; and a transmission time interval (TTI) of a specific size for sidelink communications.

Embodiment 14: According to an example embodiment of any of embodiments 10-13, wherein the transmitting comprises: transitioning, by the receive limited user device, from an idle state to a connected state with respect to the base station; and transmitting, by the receive limited user device to the base station, information indicating that the receive limited user device is a receive limited user device and is interested in receiving data of the service associated with the service identifier, and indicating a capability that the receive limited user device does not support.

Embodiment 15: According to an example embodiment of any of embodiments 10-14, wherein the transmitting comprises: transmitting, by the receive limited user device to the base station, a random access request using a receive limited associated random access preamble to indicate that the receive limited user device is a receive limited user device and is interested in receiving data of the service associated with the service identifier.

Embodiment 16: According to an example embodiment of any of embodiments 10-15, wherein the receive limited associated random access preamble is associated with the service to indicate that the receive limited user device is a receive limited user device and is interested in receiving data of the service.

Embodiment 17: According to an example embodiment of any of embodiments 10-16, wherein the receive limited associated random access preamble is associated with a capability to indicate that the receive limited user device does not support the capability.

Embodiment 18: According to an example embodiment of any of embodiments 10-17, wherein the transmitting comprises: transmitting, by the receive limited user device via a sidelink interface, information indicating that the receive limited user device is a receive limited user device and is interested in receiving data of the service associated with the service identifier.

Embodiment 19: According to an example embodiment of any of embodiments 10-18, wherein the information also indicates a communication capability that the receive limited user device does not support.

Figure 6:
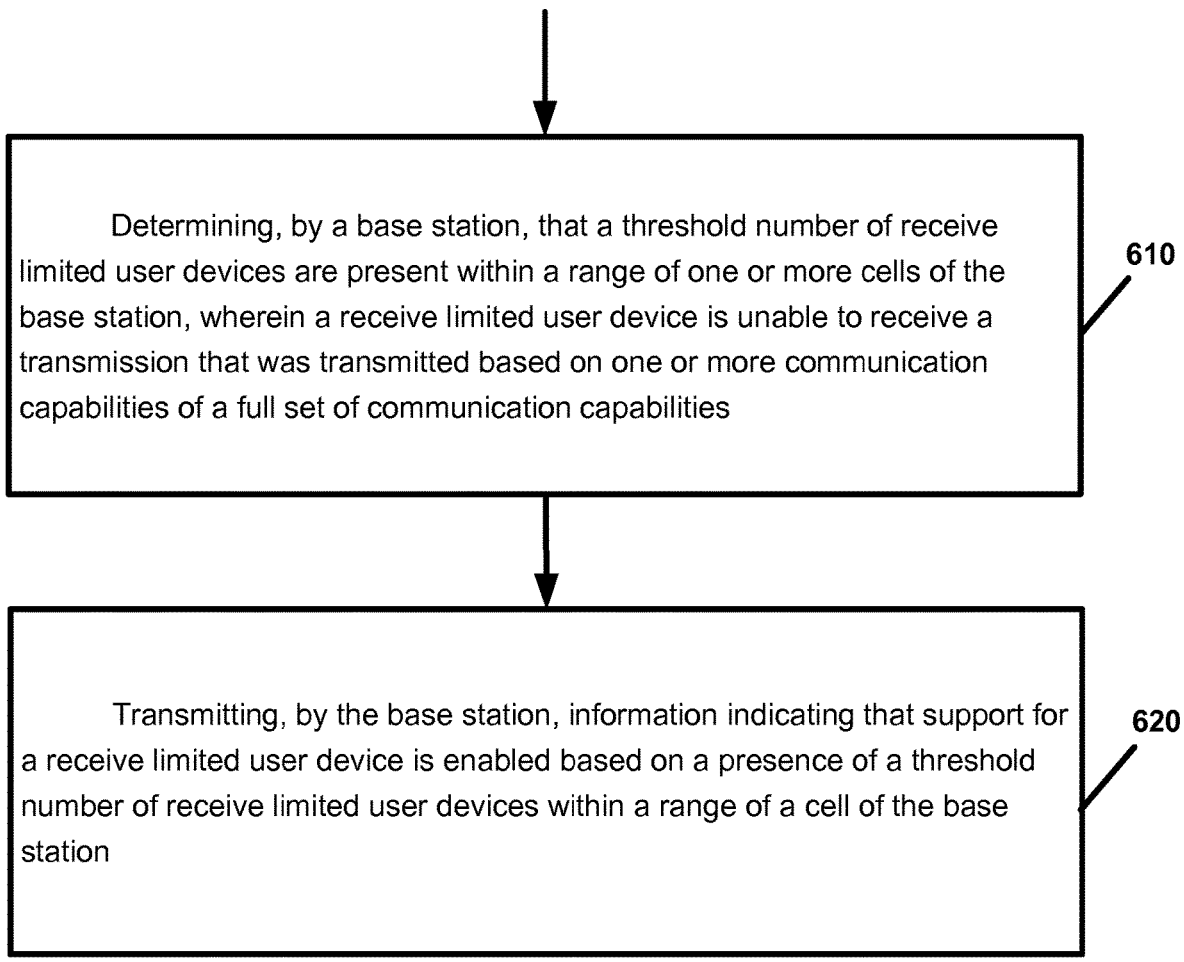
FIG. 6 is a flow chart illustrating operation of a base station according to an example embodiment.

Embodiment 20: FIG. 6 is a flow chart illustrating operation of a base station according to an example implementation. Operation 610 includes determining, by a base station, that a threshold number of receive limited user devices are present within a range of one or more cells of the base station, wherein a receive limited user device is unable to receive a transmission that was transmitted based on one or more communication capabilities of a full set of communication capabilities. And, operation 620 includes transmitting, by the base station, information indicating that support for a receive limited user device is enabled based on a presence of a threshold number of receive limited user devices within a range of a cell of the base station.

Embodiment 21: According to an example embodiment of embodiment 20, wherein a receive limited user device supports only a limited set of communication capabilities that is less than a full set of communication capabilities, and wherein the receive limited user device is unable to receive a transmission that was transmitted based on one or more communication capabilities of the full set of communication capabilities that are not part of the limited set of communication capabilities.

Embodiment 22: According to an example embodiment of any of embodiments 20-21, wherein the determining comprises: receiving, by the base station from one or more receive limited user devices, information indicating that the receive limited user device is a receive limited user device and is interested in receiving data of the service associated with the service identifier.

Embodiment 23: According to an example embodiment of any of embodiments 20-22, wherein the information also indicating one or more communication capabilities that the receive limited user device does not support.

Embodiment 24: According to an example embodiment of any of embodiments 20-23, and further comprising: transmitting, by the base station, a paging message that includes a service identifier associated with a service; and receiving, by the base station from a receive limited user device, information indicating that the receive limited user device is a receive limited user device and is interested in receiving data of the service associated with the service identifier, and indicating one or more communication capabilities that the receive limited user device does not support.

Embodiment 25: According to an example embodiment of any of embodiments 20-24, wherein the service identifier is associated with a sidelink service, and wherein the information indicating that the receive limited user device is a receive limited user device further comprises information indicating one or more communication capabilities of the full set of communication capabilities that are not supported by the user device for at least the sidelink service associated with the service identifier.

Embodiment 26: According to an example embodiment of any of embodiments 20-25, and further comprising: transmitting, by the base station, a paging message that includes a service identifier associated with a service; and receiving, by the base station from a receive limited user, a random access request via a receive limited associated random access preamble that is associated with the service, the receiving the random access request via receive limited associated random access preamble indicating that the receive limited user device is a receive limited user device and is interested in receiving data of the service associated with the service identifier.

Embodiment 27: According to an example embodiment of any of embodiments 20-26, and further comprising: transmitting, by the base station, a paging message that includes a service identifier associated with a sidelink service; and receiving, by the base station from a radio resource control (RRC) connected mode user device, information indicating presence of a receive limited user device interested in receiving data of the service associated with the service identifier, wherein the radio resource control connected mode user device detects the presence of a receive limited user device by receiving a receive limited user device indication from the receive limited user device via sidelink.

Embodiment 28: According to an example embodiment of any of embodiments 20-27, wherein the one or more communication capabilities of the full set of communication capabilities that are not supported by the user device comprise at least one of: simultaneously transmit or receive a threshold number or more of carriers for sidelink communications; a specific modulation and coding scheme (MCS) for sidelink communications; a transmit diversity for sidelink communications; and a transmission time interval (TTI) of a specific size for sidelink communications.

Embodiment 29: According to an example embodiment of any of embodiments 20-28, wherein the transmitting comprises: transmitting, by a base station, information indicating that a carrier priority based carrier selection for one or more sidelink services or vehicle-to-everything (V2X) services is enabled based on a presence of a threshold number of receive limited user devices within a range of a cell of the base station.

Embodiment 30: An apparatus comprising means for performing a method of any of embodiments 1-29.

Embodiment 31: An apparatus comprising at least one processor and at least one memory including computer instructions that, when executed by the at least one processor, cause the apparatus to perform a method of any of embodiments 1-29.

Embodiment 32: An apparatus comprising a computer program product including a non-transitory computer-readable storage medium and storing executable code that, when executed by at least one data processing apparatus, is configured to cause the at least one data processing apparatus to perform a method of any of embodiments 1-29.

Figure 7:
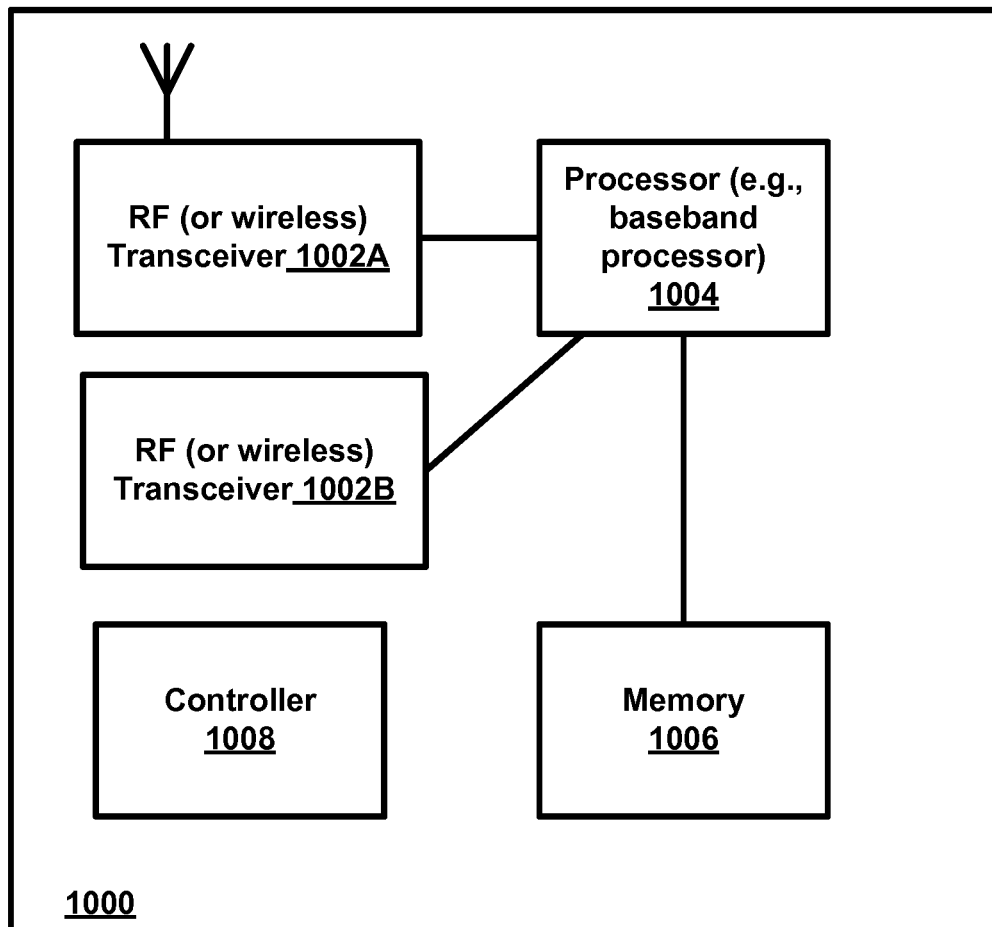
FIG. 7 is a block diagram of a node or wireless station (e.g., base station/access point, relay node or mobile station/user device/UE) according to an example embodiment.

FIG. 7 is a block diagram of a wireless station (e.g., AP, BS, relay node, eNB/gNB, UE or user device) 1000 according to an example embodiment. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 7, a controller (or processor) 1008 may execute software and instructions, and may provide overall control for the station 1000, and may provide control for other systems not shown in FIG. 7, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a user device from a base station, information indicating that support for a receive limited user device is enabled based on a presence of a threshold number of receive limited user devices within a range of a cell of the base station, wherein a receive limited user device supports a limited set of communication capabilities that is less than a full set of communication capabilities, and wherein the receive limited user device is unable to receive a transmission that was transmitted based on one or more communication capabilities of the full set of communication capabilities that are not part of the limited set of communication capabilities;
   selecting, by the user device in response to the receiving, one or more communication capabilities to support a receive limited user device; and
   transmitting, by the user device, information using the selected one or more communication capabilities.

2. The method of claim 1 wherein the one or more communication capabilities of the full set of communication capabilities that are not part of the limited set of communication capabilities supported by the user device comprise at least one of:
   simultaneously transmit or receive a threshold number or more of carriers for sidelink communications;
   a specific modulation and coding scheme (MCS) for sidelink communications;
   a transmit diversity for sidelink communications; and
   a transmission time interval (TTI) of a specific size for sidelink communications.

3. The method of claim 1 wherein the selecting one or more communication capabilities comprises at least one of:
   selecting, by a user device, a carrier from a plurality of carriers using carrier priority based carrier selection based on receiving an indication that carrier priority based carrier selection is enabled or based on an indication that a receive limited user device is present that is unable to simultaneously receive a threshold number or more of carriers;
   selecting, by a user device, a modulation and coding schemes (MCS) for transmission out of a set of modulation and coding schemes (MCS) that does not include the specific modulation and coding scheme (MCS) based on receiving an indication that the specific modulation and coding scheme (MCS) is disabled;
   selecting, by a user device, not to use transmit diversity for transmission based on an indication that transmit diversity is disabled; and
   selecting, by a user device, not to use the specific size transmission time interval (TTI) for transmission based on receiving an indication that the specific size TTI is disabled.

4. The method of claim 1 wherein the selecting, by the user device, one or more communication capabilities to support a receive limited user device comprises selecting, by the user device, one or more communication capabilities for a sidelink service, including selecting one or more of the following communication capabilities for a sidelink service(s), wherein one or more of the communication capabilities are selectable per sidelink service:
   selecting, by a user device for a sidelink service, a carrier for a sidelink transmission for the sidelink service from a plurality of carriers using carrier priority based carrier selection based on receiving an indication that carrier priority based carrier selection is enabled for the sidelink service or based on an indication that a receive limited user device that is interested in receiving the sidelink service is present that is unable to simultaneously receive a threshold number or more of carriers;
   selecting, by a user device for a sidelink service, a modulation and coding scheme (MCS) for a sidelink transmission for the sidelink service out of a set of modulation and coding schemes (MCS) that does not include the specific modulation and coding scheme (MCS) based on receiving an indication that the specific modulation and coding scheme (MCS) is disabled for the sidelink service;

selecting, by a user device for a sidelink service, not to use transmit diversity for a sidelink transmission for the sidelink service based on an indication that transmit diversity is disabled for the sidelink service; and selecting, by a user device for a service, not to use the specific size transmission time interval (TTI) for a sidelink transmission for the sidelink service based on receiving an indication that the specific size TTI is disabled for the sidelink service.

5. The method of claim 1 wherein the information indicating that support for a receive limited user device is enabled is received by the user device via a system information block (SIB) associated with sidelink services or vehicle-to-everything (V2X) services.

6. The method of claim 1 wherein the receiving comprises:
receiving, by a user device from a base station, information indicating that support for a receive limited user device for one or more sidelink services or vehicle-to-everything (V2X) services is enabled based on a presence of a threshold number of receive limited user devices within a range of a cell of the base station.

7. The method of claim 1 wherein, in response to receiving the information, the support of receive limited user device is enabled for a specific time period.

8. The method of claim 1:
wherein the receiving comprises receiving at least one of an indication that carrier priority based carrier selection is enabled for a sidelink service or an indication that a receive limited user device that is interested in receiving the sidelink service is present that is unable to simultaneously receive a threshold number or more of carriers; and
wherein the selecting comprises selecting, by the user device, a carrier for a sidelink transmission for the sidelink service from a plurality of carriers using carrier priority based carrier selection.

9. A method comprising:
determining, by a base station, that a threshold number of receive limited user devices are present within a range of one or more cells of the base station, wherein a receive limited user device is unable to receive a transmission that was transmitted based on one or more communication capabilities of a full set of communication capabilities; and
transmitting, by the base station, information indicating that support for a receive limited user device is enabled based on a presence of a threshold number of receive limited user devices within a range of a cell of the base station;
wherein a receive limited user device supports a limited set of communication capabilities that is less than a full set of communication capabilities, and wherein the receive limited user device is unable to receive a transmission that was transmitted based on one or more communication capabilities of the full set of communication capabilities that are not part of the limited set of communication capabilities.

10. The method of claim 9:
wherein the determining comprises receiving, by the base station from one or more receive limited user devices, information indicating that the receive limited user device is a receive limited user device and is interested in receiving data of the service associated with the service identifier; and wherein the information also indicating one or more communication capabilities that the receive limited user device does not support.

11. The method of claim 9 and further comprising:
transmitting, by the base station, a paging message that includes a service identifier associated with a service; and
receiving, by the base station from a receive limited user device, information indicating that the receive limited user device is a receive limited user device and is interested in receiving data of the service associated with the service identifier, and indicating one or more communication capabilities that the receive limited user device does not support.

12. The method of claim 11, wherein the service identifier is associated with a sidelink service, and wherein the information indicating that the receive limited user device is a receive limited user device further comprises information indicating one or more communication capabilities of the full set of communication capabilities that are not supported by the user device for at least the sidelink service associated with the service identifier.

13. The method of claim 9 and further comprising:
transmitting, by the base station, a paging message that includes a service identifier associated with a service; and
receiving, by the base station from a receive limited user, a random access request via a receive limited associated random access preamble that is associated with the service, the receiving the random access request via receive limited associated random access preamble indicating that the receive limited user device is a receive limited user device and is interested in receiving data of the service associated with the service identifier.

14. The method of claim 9 and further comprising:
transmitting, by the base station, a paging message that includes a service identifier associated with a sidelink service; and
receiving, by the base station from a radio resource control (RRC) connected mode user device, information indicating presence of a receive limited user device interested in receiving data of the service associated with the service identifier, wherein the radio resource control connected mode user device detects the presence of a receive limited user device by receiving a receive limited user device indication from the receive limited user device via sidelink.

15. The method of claim 9 wherein the transmitting comprises:
transmitting, by a base station, information indicating that a carrier priority based carrier selection for one or more sidelink services or vehicle-to-everything (V2X) services is enabled based on a presence of a threshold number of receive limited user devices within a range of a cell of the base station.

16. An apparatus comprising:
at least one processor; and
at least one memory including computer program code;
the at least one memory and the computer program code configured to, with the at least one processor, cause the apparatus at least to:
receive, by a user device from a base station, information indicating that support for a receive limited user device is enabled based on a presence of a threshold number of receive limited user devices within a range of a cell of the base station, wherein a receive limited user device is unable to receive a transmission that was transmitted based on one or more communication capabilities of a full set of communication capabilities, wherein a receive limited user device supports a limited set of communication capabilities that is less than a full set of communication capabilities, and wherein the receive limited user device is unable to receive a transmission that was transmitted based on one or more communication capabilities of the full set of communication capabilities that are not part of the limited set of communication capabilities;

select, by the user device in response to the receiving, one or more communication capabilities to support a receive limited user device; and transmit, by the user device, information using the selected one or more communication capabilities.

17. The apparatus of claim 16 wherein the one or more communication capabilities of the full set of communication capabilities that are not part of the limited set of communication capabilities supported by the user device comprise at least one of:
- simultaneously transmit or receive a threshold number or more of carriers for sidelink communications;
- a specific modulation and coding scheme (MCS) for sidelink communications;
- a transmit diversity for sidelink communications; and
- a transmission time interval (TTI) of a specific size for sidelink communications.

18. An apparatus comprising:

at least one processor; and at least one memory including computer program code;

the at least one memory and the computer program code configured to, with the at least one processor, cause the apparatus at least to:

determine, by a base station, that a threshold number of receive limited user devices are present within a range of one or more cells of the base station, wherein a receive limited user device is unable to receive a transmission that was transmitted based on one or more communication capabilities of a full set of communication capabilities; and transmit, by the base station, information indicating that support for a receive limited user device is enabled based on a presence of a threshold number of receive limited user devices within a range of a cell of the base station;

wherein a receive limited user device supports a limited set of communication capabilities that is less than a full set of communication capabilities, and wherein the receive limited user device is unable to receive a transmission that was transmitted based on one or more communication capabilities of the full set of communication capabilities that are not part of the limited set of communication capabilities.

* * * * *